US008047492B2

(12) United States Patent
Wang

(10) Patent No.: US 8,047,492 B2
(45) Date of Patent: Nov. 1, 2011

(54) HANGER

(76) Inventor: Dennis H. Wang, Baldwin Park, CA (US)

( * ) Notice: Subject to any disclaimer, the term of this patent is extended or adjusted under 35 U.S.C. 154(b) by 350 days.

(21) Appl. No.: 12/407,050

(22) Filed: Mar. 19, 2009

(65) Prior Publication Data

US 2010/0237213 A1 Sep. 23, 2010

(51) Int. Cl.
*F16B 45/00* (2006.01)

(52) U.S. Cl. ..................... 248/307; 248/298.1; 248/339; 248/340; 211/17; 211/106.01; 211/196

(58) Field of Classification Search ................ 269/3, 95, 269/149, 249; 248/215, 227, 298.1, 307, 248/339, 340; 211/17, 70.6, 106.01, 18, 211/118, 196, 197, 205
See application file for complete search history.

(56) References Cited

U.S. PATENT DOCUMENTS 595,967 A * 12/1897 Parsons ............................. 410/3
1,332,690 A * 3/1920 Rosenfeld ....................... 174/63
1,667,669 A * 4/1928 Megee ............................ 211/24
2,919,946 A * 1/1960 Miener ......................... 292/288
3,872,972 A * 3/1975 Cummins et al. ............... 211/17
5,230,449 A * 7/1993 Collins et al. ................. 224/493
5,495,970 A * 3/1996 Pedrini ......................... 224/314
6,161,702 A * 12/2000 Campbell ....................... 211/17
6,494,327 B2 * 12/2002 Huang ............................ 211/17
7,150,449 B1 * 12/2006 Dueck et al. .................. 254/278
2003/0222191 A1 * 12/2003 Tsai ........................... 248/354.1
2004/0149870 A1 * 8/2004 Brannen et al. ............ 248/213.2
2008/0190979 A1 * 8/2008 Robins et al. ................. 224/492

* cited by examiner

*Primary Examiner* — Terrell McKinnon
*Assistant Examiner* — Michael McDuffie
(74) *Attorney, Agent, or Firm* — Alan Kamrath; Kamrath & Associates PA

(57) ABSTRACT

A hanger includes a body member including two hanging ends, a pivoted portion between the hanging ends and two slide rails provided between the pivoted portion and hanging ends respectively. A fastener unit is coupled to the pivoted portion for positioning the body member in a horizontal direction. Two slide members are respectively slideably disposed on the slide rails, with each slide member including a first receiving groove inserted by the related slide rail and a second receiving groove. Two hook members are pivotally coupled to the slide members respectively, with a longitudinal direction of each hook member being perpendicular to the ground.

16 Claims, 12 Drawing Sheets

HANGER

BACKGROUND OF THE INVENTION

1. Field of the Invention

The present invention relates to a hanger including a body member and slide member slideably mounted on the body member and hanging articles such as bicycles or kayaks for display.

2. Description of the Related Art

A conventional hanger device as shown in FIGS. 11 and 12 includes a hanger 100, two slots 101 formed on two ends of the hanger 100 and two hooks 102 slideably disposed in the slots 101 respectively via two fasteners 103. Each hook 102 has a through-hole, and each fastener 103 is adapted to insert through the through-hole of the related hook 102 and to be engaged with the related slot 101. The fasteners 103 are adapted to tighten/loosen the hooks 102 with respect to the hanger 100 and allow fixing/sliding of the hooks 102 with respect to the slots 101. A clamping device 104 is disposed on the hanger 100 between the two ends of the hanger 100 and attaches the hanger 100 to a hanger stand (not shown).

However, the structure strength of the hanger 100 could be weakened via the slots 101 which are formed on the hanger 100, and the hooks 102 are limited to slide along the related slot 101 only. The large size of each slot 101, the more weakened structure of the hanger 100. Moreover, each hook 102 is attached to the hanger 100 via the fastener 103 so that the hooks 102 can not slide along the related slot 101 in a smooth manner.

The present invention is therefore intended to obviate or at least alleviate the problems encountered in the prior art.

SUMMARY OF THE INVENTION

Aspects of the present invention address one or more of the issues mentioned above, thereby providing a hanger for hanging bicycles, kayaks or whatever. The hanger includes a body member, two slide members slideably disposed on the body member, two hook members respectively installed to the slide members and adapted to hang the top tube of bicycles or kayaks and a hook strap unit coupled to one end of the body member and adapted to hang the head tube of bicycles.

Other advantages and features of the present invention will become apparent from the following descriptions referring to the drawings.

BRIEF DESCRIPTION OF THE DRAWINGS

The present invention will be described via detailed illustration of the preferred embodiment referring to the drawings.

DETAILED DESCRIPTION OF THE PREFERRED EMBODIMENT

Figure 10:
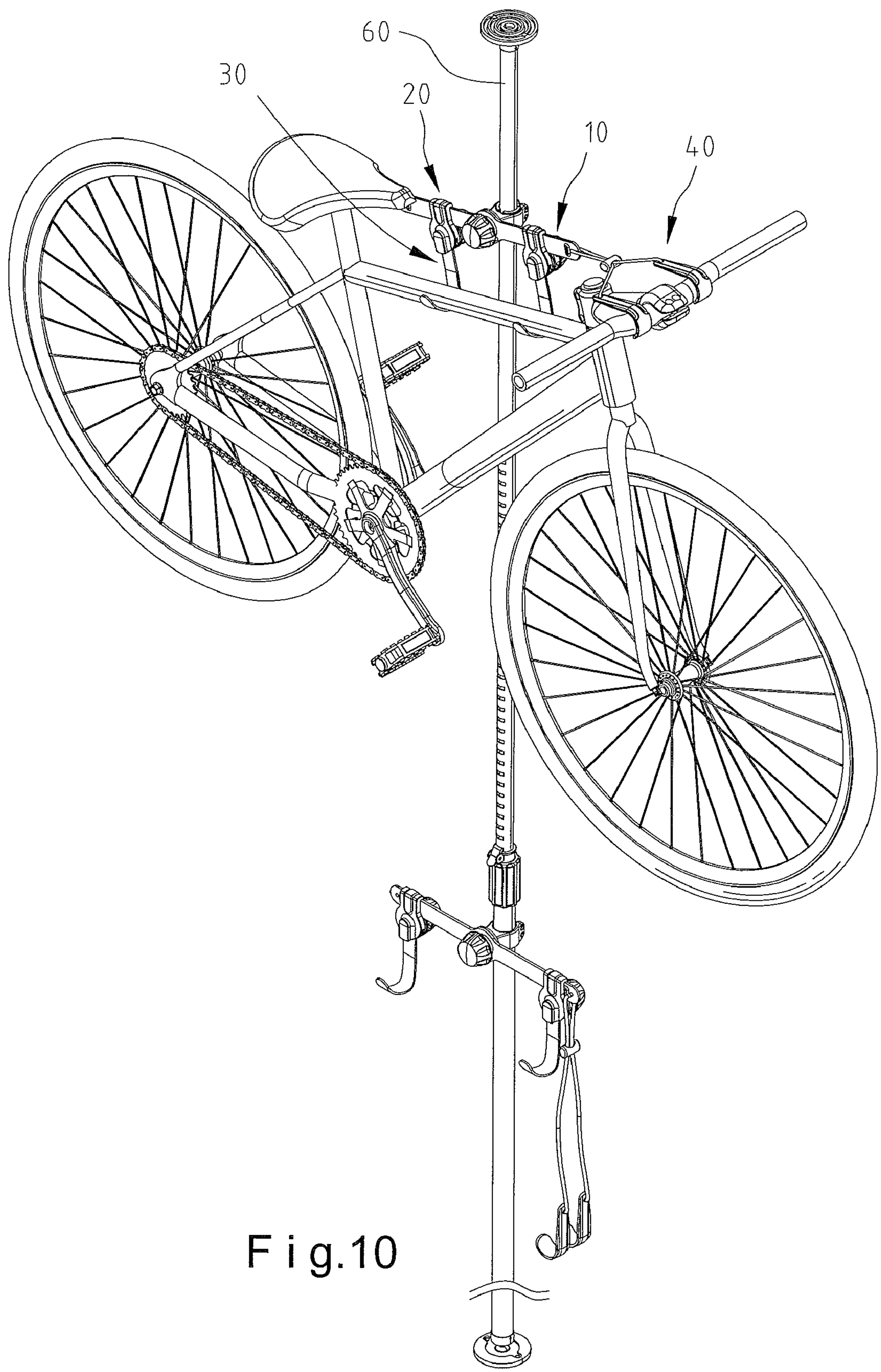
FIG. 10 is a perspective view of the hanger attached to a hanger stand shown in FIG. 1, illustrating a bicycle held on the hanger for display.
Figure 11:
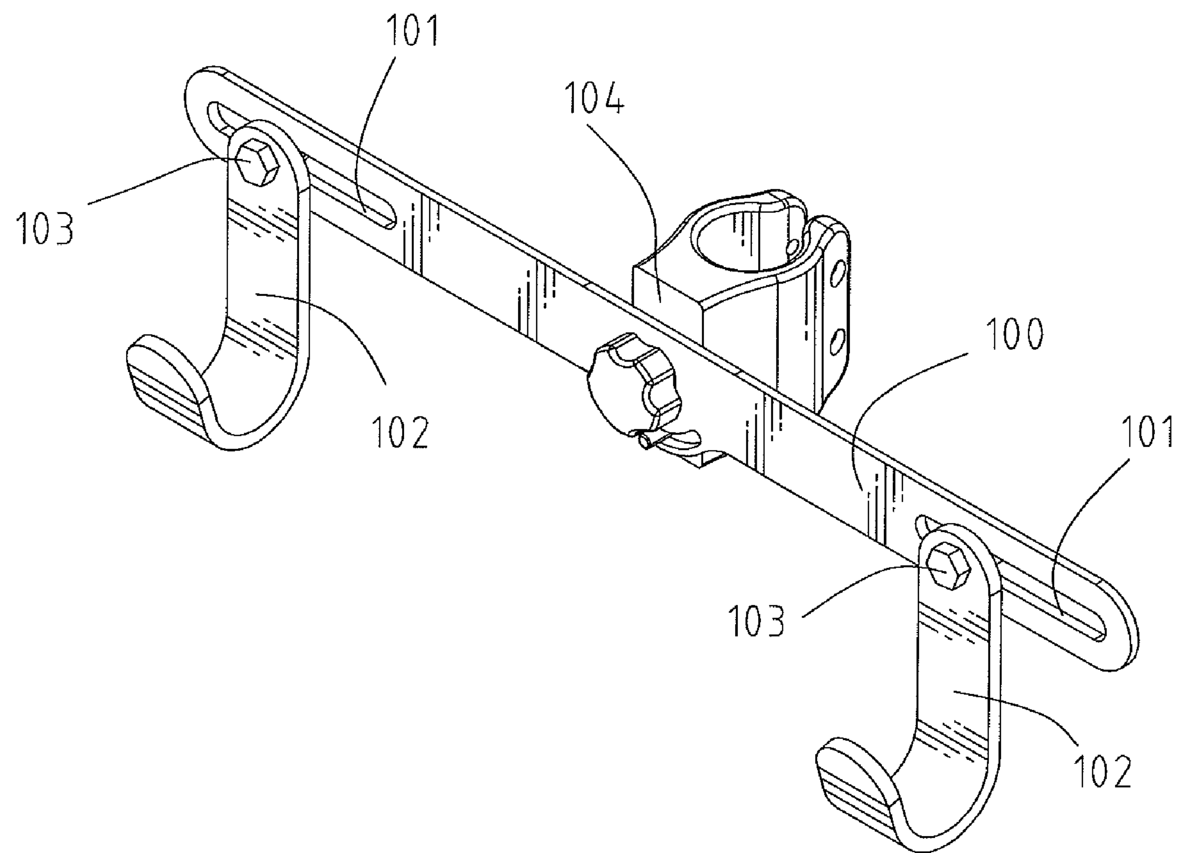
FIG. 11 is a perspective view of a conventional hanger device.
Figure 12:
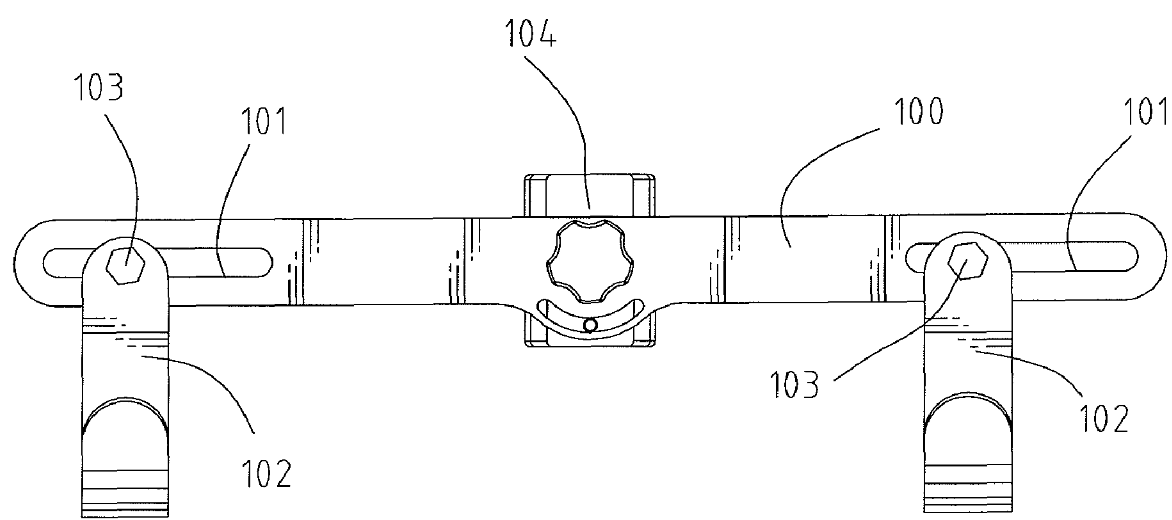
FIG. 12 is a front view of the conventional hanger device shown in FIG. 11.

Referring to FIGS. 1 through 6, a hanger in accordance with the preferred embodiment in the present invention includes a body member 10, two slide members 20, two hook members 30 and a hook strap unit 40. Further according to FIG. 10, the body member 10 is adjustably and pivotally attached to a hanger stand 60 via a fastener unit 50. The slide members 20 are slideably installed to two ends of the body member 10 respectively. The hook members 30 are pivotally coupled to the slide members 20 respectively and adapted to hang a top tube of a bicycle (not numbered). The hook strap unit 40 is adapted to clamp handlebars of the bicycle to fix a head tube of the bicycle.

Two hanging ends 11 are respectively defined at the two ends of the body member 10, and a pivoted portion 13 is defined on the body member 10 between the hanging ends 11. Two slide rails 12 are provided between the hanging ends 11 and the pivoted portion 13, respectively. The distal of each hanging end 11 is in the form of a semi-circle, and a profile of the pivoted portion 13 is approximately a circle. A diameter of each hanging end 11 is equal to a width of each slide rail 12 and is smaller than a diameter of the pivoted portion 13. A limiting portion 111 is provided on the body member 10 between each hanging end 11 and the related slide rail 12, and a connected hole 14 is provided between each limiting portion 111 and the related hanging end 11.

The pivoted portion 13 has a through-hole 131 at the center thereof and an arcuate slot 132 alongside the circumference thereof. The fastener unit 50 is engaged with the body member 10 at the pivoted portion 13 for positioning the body member 10 in a horizontal direction and includes a clamping element 51 and a fastener knob 52 engaging the clamping element with the pivoted portion 13 of the body member 10. The clamping element 51, which is provided on one side of the body member 10, includes a clamping end 511 adapted to adjustably clamp the hanger stand 60 (shown in FIG. 10) and an abutted end 512 abutting against the pivoted portion 13. The abutted end 512 has a threaded coupled hole 5121 corresponding to the through-hole 131 and a limited projection 5122 provided in the arcuate slot 132 for sliding therealong. A threaded insertion end 521 is formed on a side of the fastener knob 52 and adapted to insert through the through-hole 131 and engage with the coupled hole 5121. Thus, the body member 10 is able to pivot with respect to the fastener unit 50, and a pivotal angle of the body member 10 is restricted by a dimension of the arcuate slot 132.

The clamping end 511 forms two ears 5112 for clamping the hanger stand 60. The hanger stand 60 is inserted through a compartment 5111 enclosed by the ears 5112. A space 5114 is defined between the distal of the ears 5112 and adjustable via two fasteners 5115 inserted through holes 5113 which are respectively formed on the distal of the ears 5112. The fasteners 5115 are operated for tightening/loosening the hanger stand 60.

The slide members 20 are respectively slideably disposed on the slide rails 12, and each slide member 20 includes a first receiving groove 21 inserted by the related slide rail 12 and a second receiving groove 22 adapted to receive the related hook member 30. The first and second receiving grooves 21 and 22 are parallel to each other but not in commutation with each other. The first receiving groove 21 is opened to the lateral and bottom sides of the related slide member 20 and includes a sliding portion 211 and a limited portion 212 extending from the sliding portion 211. The slide rail 12 is slideably restricted in the related sliding portion 211 and limited by the limited portion 212 in a longitudinal direction, because a width D of the sliding portion 211 is approximately equal to the thickness of each slide rail 12 but larger than a width d of the limited portion 212.

The second receiving groove 22 forms a pivoted receptacle 221 proximal to the bottom side of each slide member 20. The pivoted receptacle 221 has an arcuate bottom edge (not numbered) and two abutted sides 2211 such as to form the pivoted receptacle 221 to be sector-shaped. Moreover, a pivotal angle of the hook member 30 in the pivoted receptacle 221 is restricted by the abutted sides 2211. A plurality of slots 2212 are longitudinally formed on the bottom surface of the pivoted receptacle 221 adjacent to the first receiving groove 21 and adapted to reduce friction between the hook member 30 and the pivoted receptacle 221 and further decrease the material cost of the slide members 20. A width of each slot 2212 is smaller than that of the hook member 30.

A first hole 24 and a second hole 25 both pierce through the first and second receiving grooves 21 and 22 transversely. A threaded portion 241 is formed at an end of the first hole 24 and opposite to the first receiving groove 21. A housing plate 26 is integrally coupled to the second receiving groove 22 and hides the second receiving groove 22 and first and second holes 24 and 25.

Each hook member 30 includes a connected end 31 received in the pivoted receptacle 221 of the second receiving groove 22 and a hook end 32 extending from the connected end 31 adapted for hanging the top tube of the bicycle or for hanging kayaks. Each connected end 31 includes a pivotal hole 311 corresponding to the first hole 24 and an arcuate hole 312 corresponding to the second hole 25.

A slide member knob 27 is provided to the side of each slide member 20 and forms a threaded insertion end 271 to insert through the first hole 24 and the pivotal hole 311 and engage with the threaded portion 241 as to pivotally install each hook member 30 to the related slide member 20. A pin 28 is inserted through the second hole 25 and the arcuate hole 312 and abutted between the slide member knob 27 and the housing plate 26. Therefore, the pin 28 is restricted by the arcuate hole 312, and the pivotal angle of the hook member 30 in the pivoted receptacle 221 is also restricted by the arcuate hole 312. The hook member 30 is able to pivot with respect to the related slide member 20 for maintaining a longitudinal direction of the hook member 30 to be parallel to the hanger stand 60.

The hook strap unit 40 is selectively installed to one of the connected holes 14 and includes a strap 41, two hook elements 42 and a tightening element 43. Each hook element 42 includes a connected end 421, a hook end 422 extending from the connected end 421 and a hole 423 defined on the connected end 421. In addition, an extending direction of each hook end 32 is perpendicular to that of each hook end 422. Therefore, the hanger is suitable to hang the top and head tubes of the bicycle at the same time.

The strap 41 is inserted through the selected connected hole 14 first, and, then, two strap ends 411 of the strap 41 are both inserted through a clamping hole 431 of the tightening element 43. Next, the two strap ends 411 of the strap 41 are respectively inserted through the holes 423 of the hook elements 42 and form two knotted ends 412 for fixing the hook elements 42 to the strap 41. By operation of an operation end 432 of the tightening element 43, a position of the tightening element 43 at the strap 41 is adjustable, and, further, a distance between the two hook elements 42 is variable and adapted to various sizes of bicycles.

Figure 1:
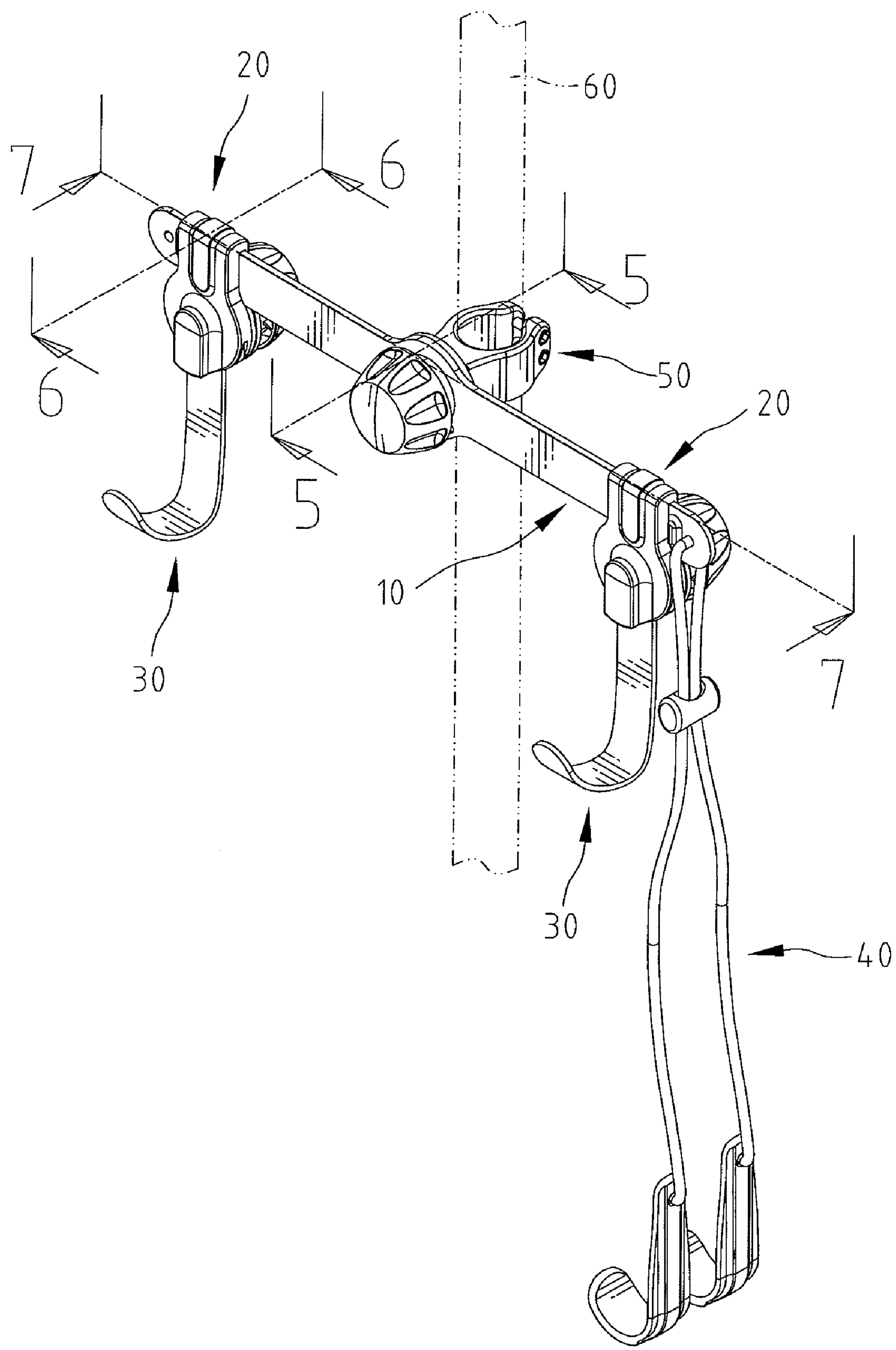
FIG. 1 is a perspective view of a hanger according to the preferred embodiment of the present invention.
Figure 2:
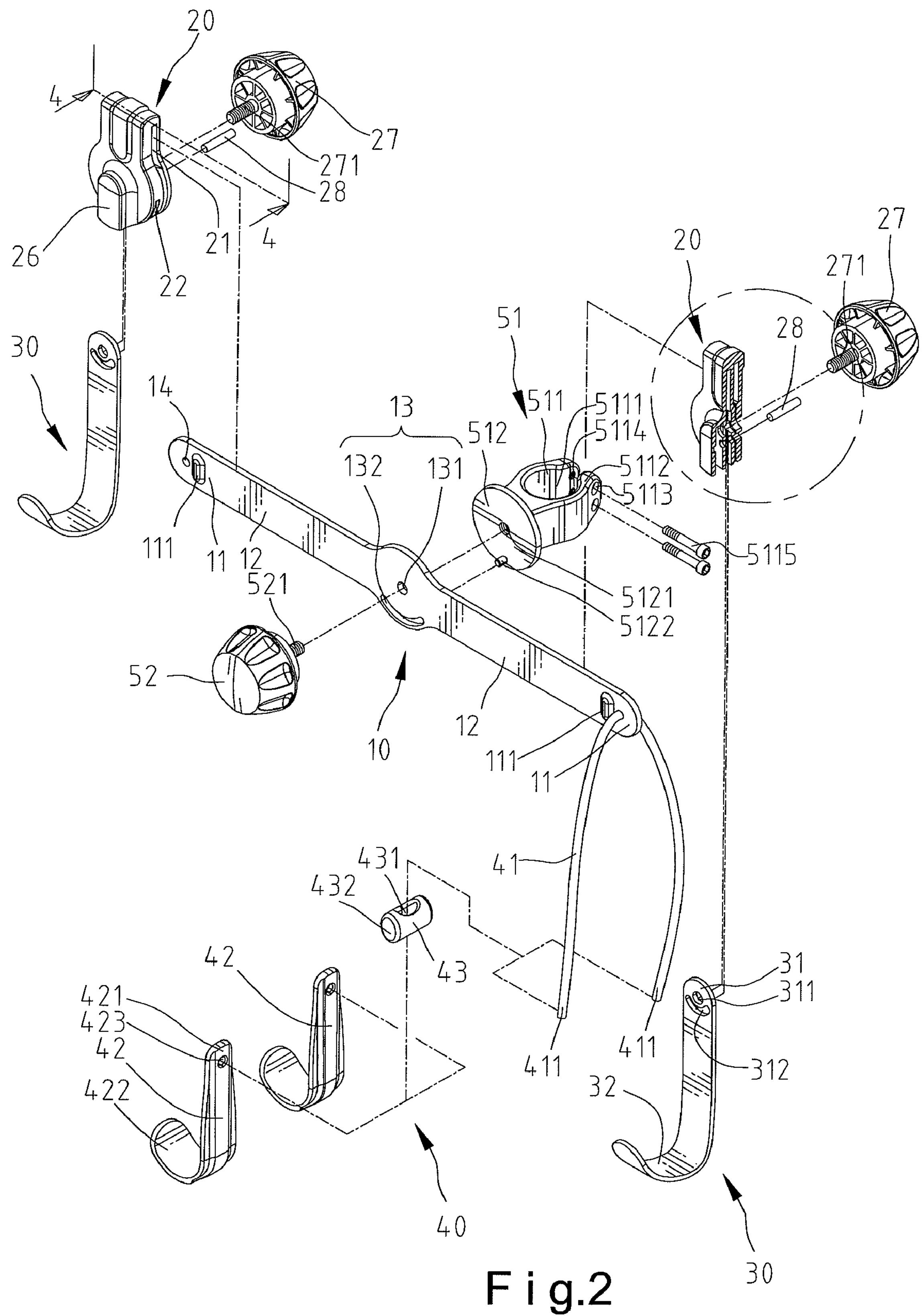
FIG. 2 is an exploded view of the hanger shown in FIG. 1.
Figure 3:
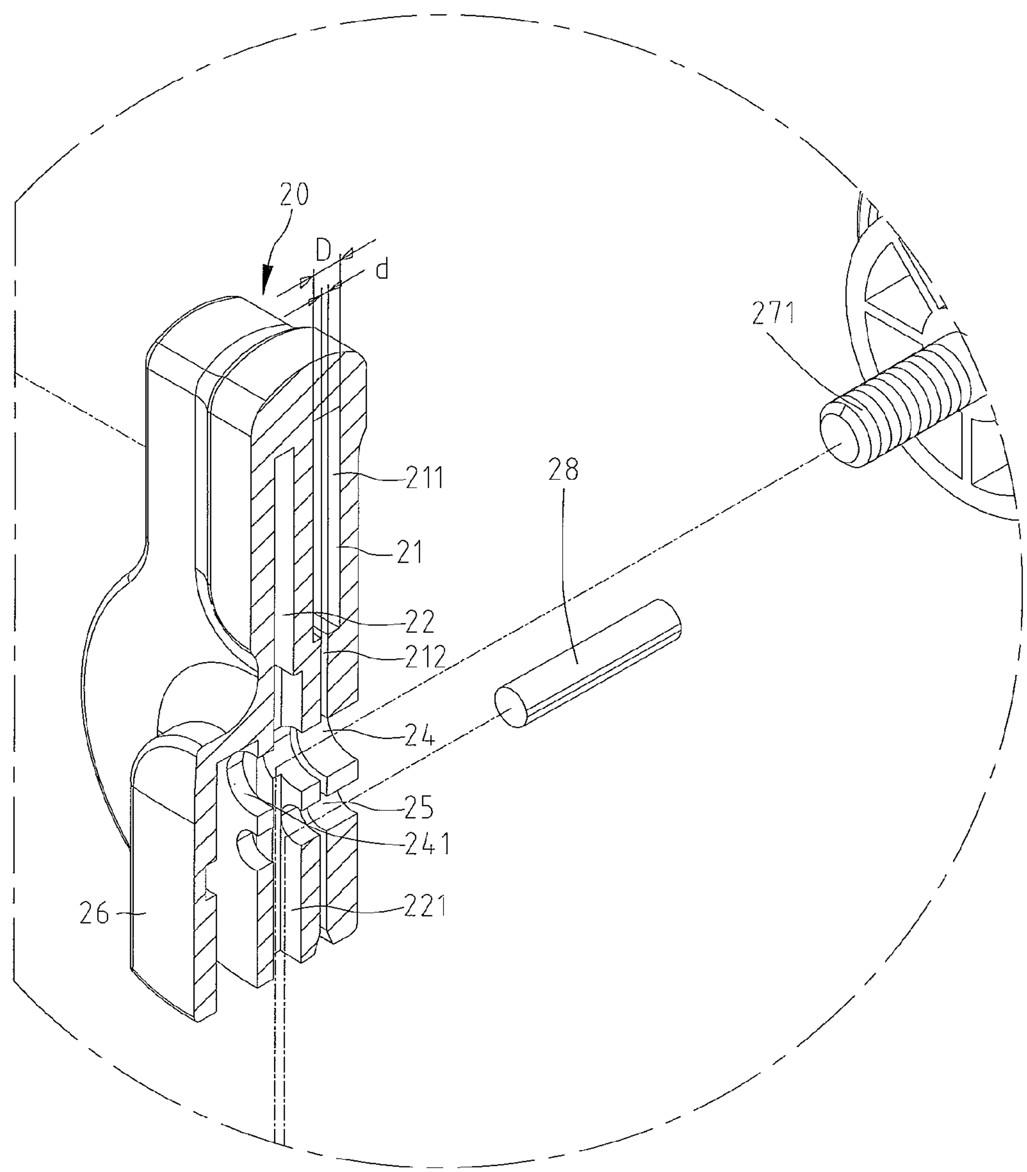
FIG. 3 is a partial, enlarged view of a slide member of the hanger shown in FIG. 2.
Figure 4:
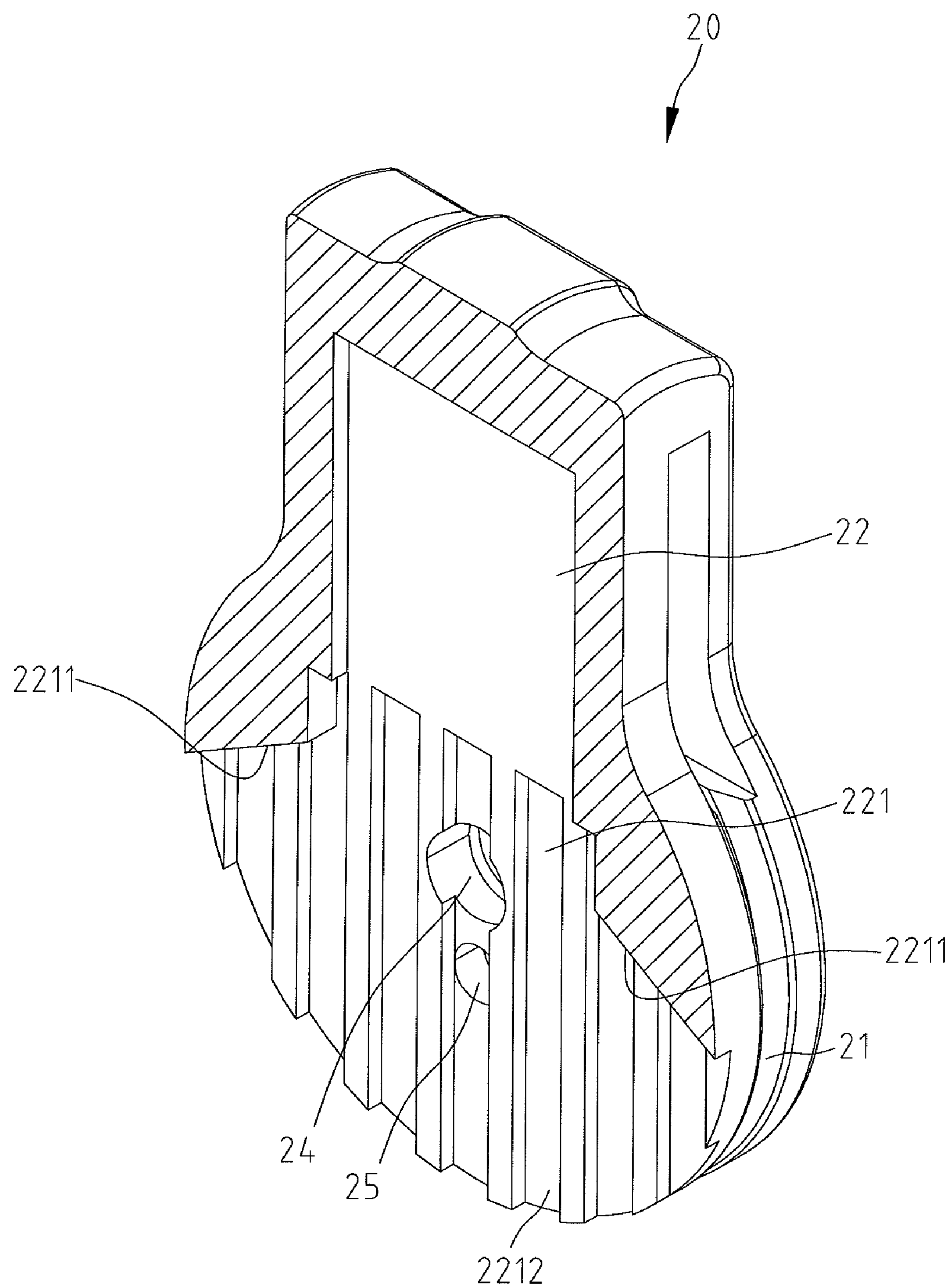
FIG. 4 is a cross-sectional view of the slide member of the hanger taken along a line 4-4 shown in FIG. 2.
Figure 5:
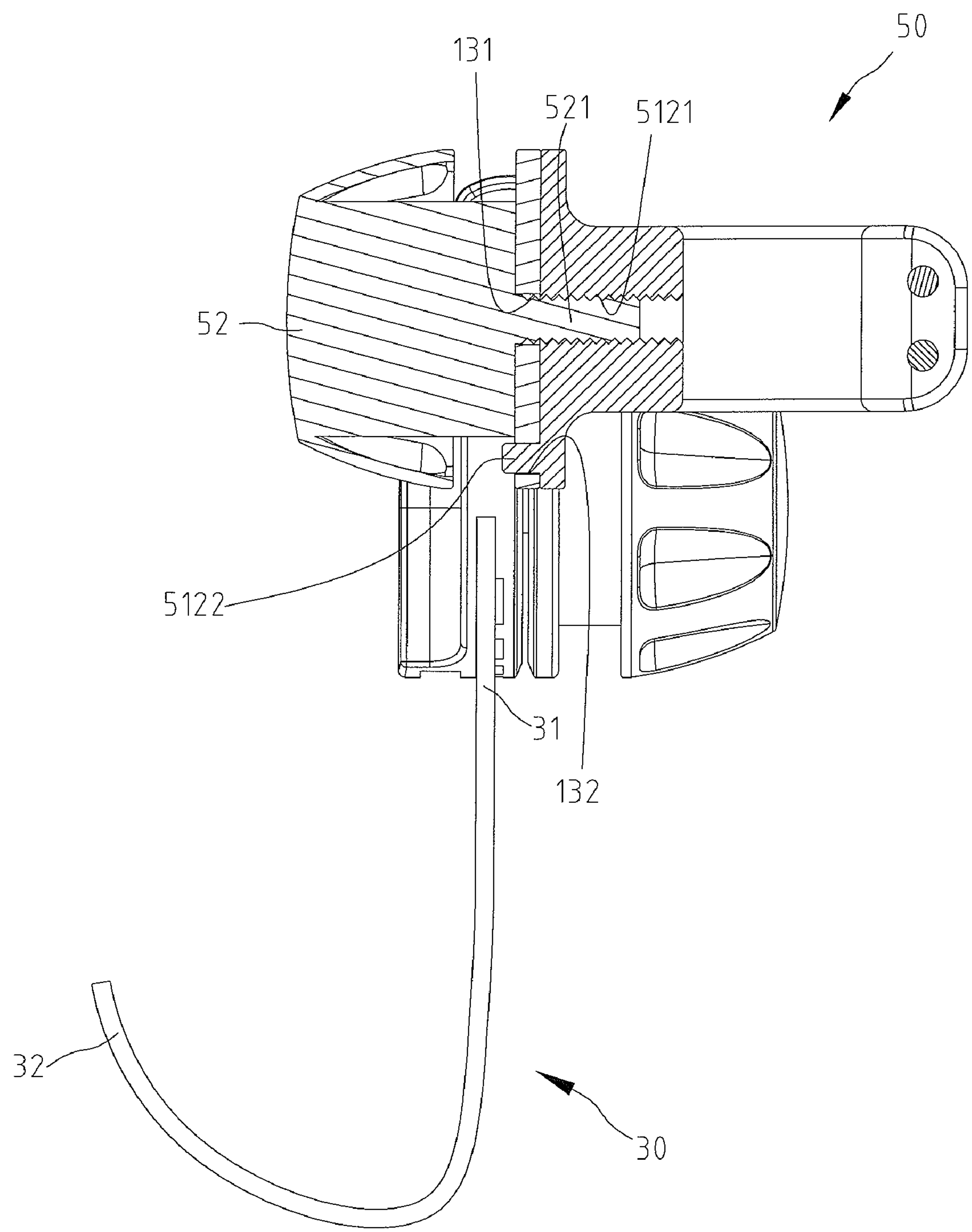
FIG. 5 is a partial, side view of the hanger taken along a line 5-5 shown in FIG. 1.
Figure 6:
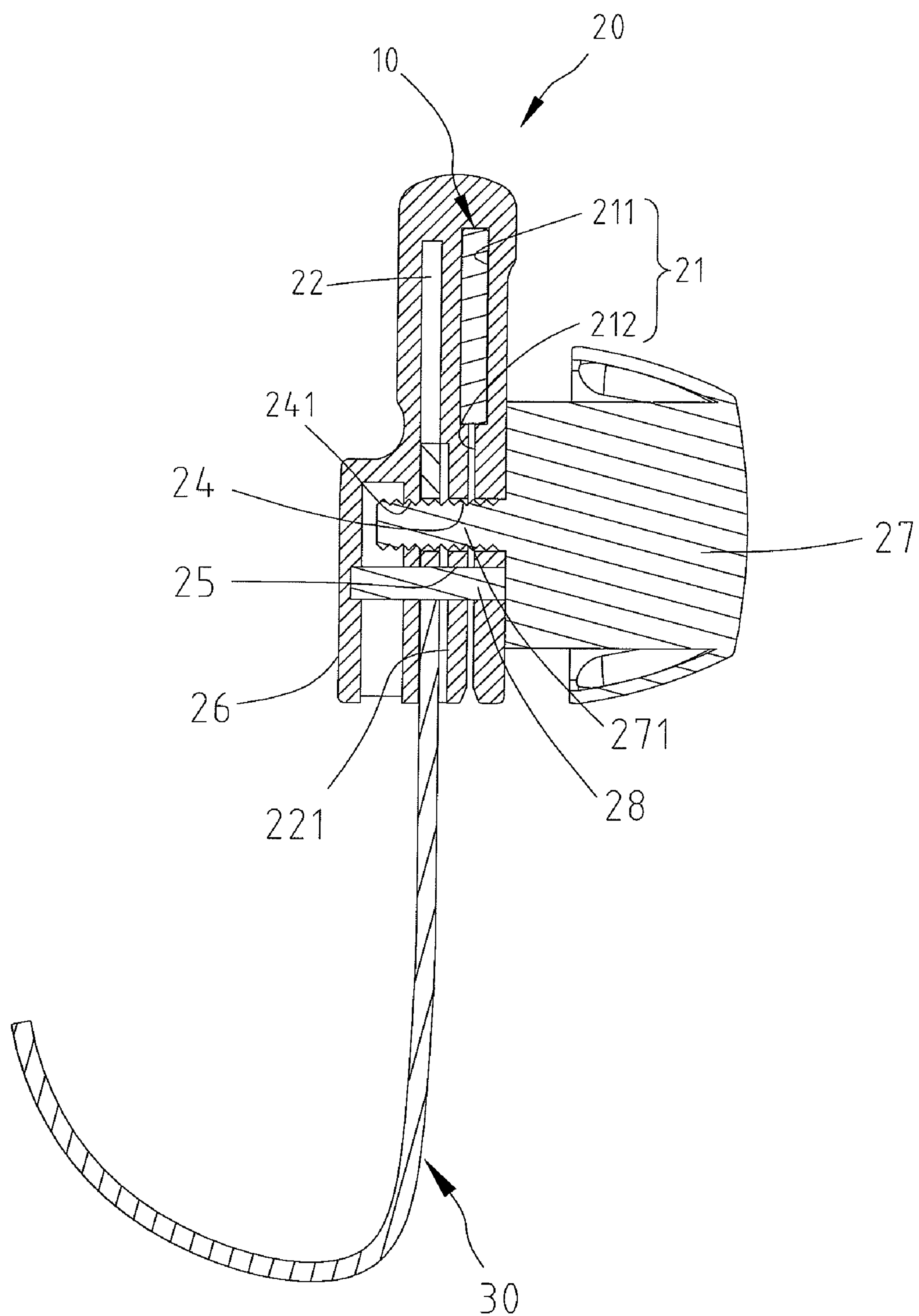
FIG. 6 is another partial, side view of the hanger taken along a line 6-6 shown in FIG. 1.
Figure 7:
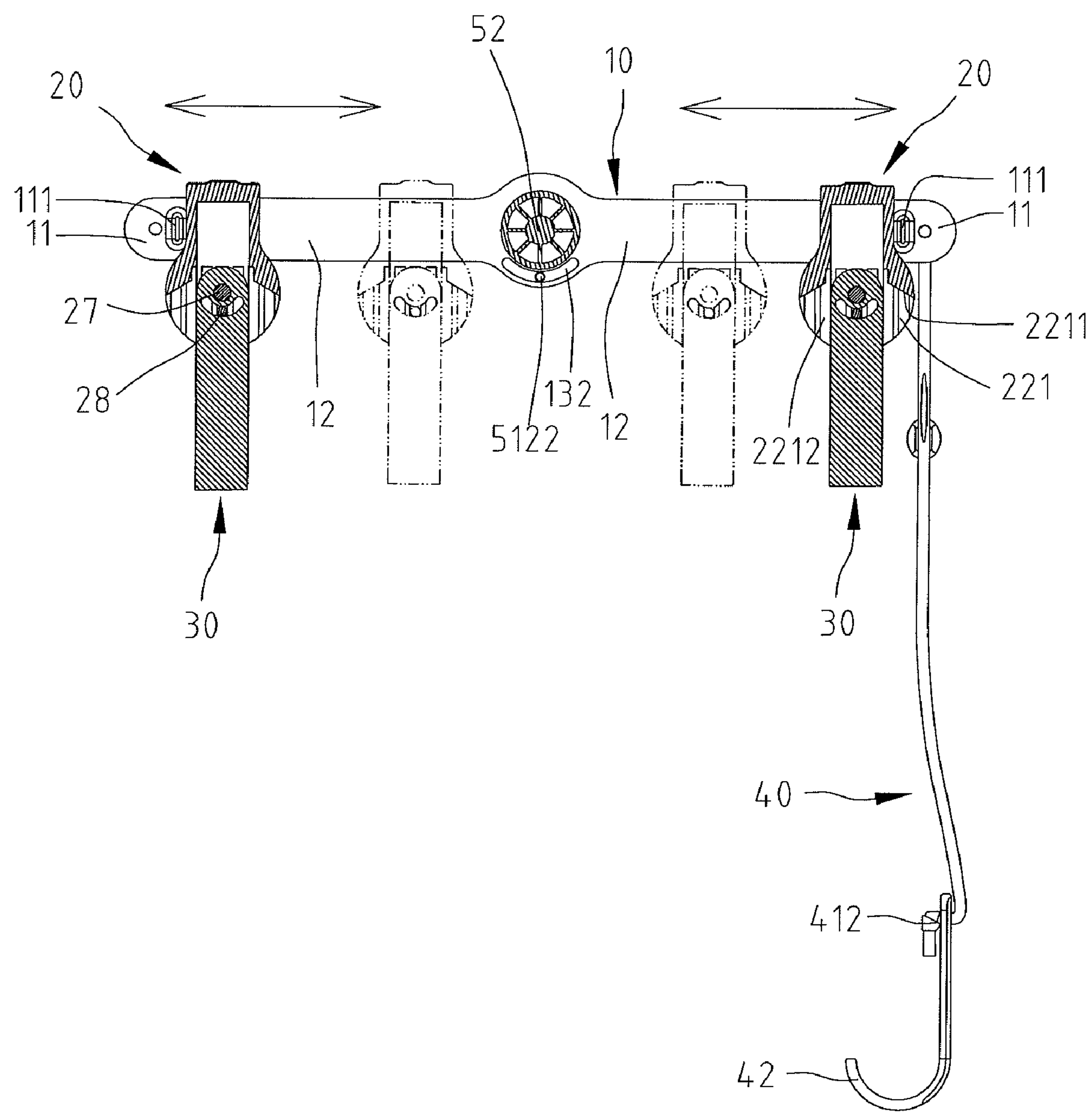
FIG. 7 is a front view of the hanger taken along a line 7-7 shown in FIG. 1.
Figure 8:
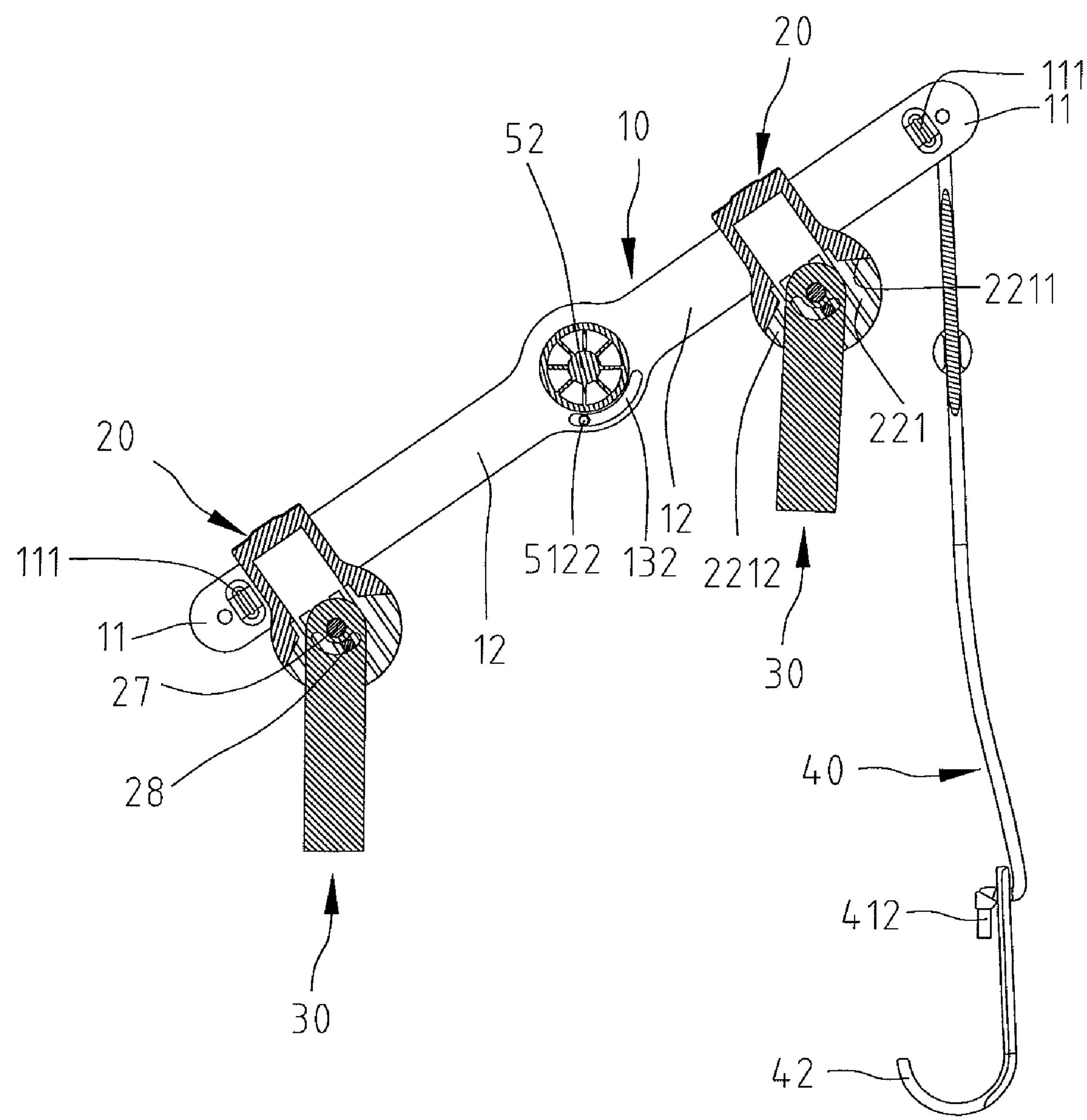
FIG. 8 is a front view of the hanger shown in FIG. 1 similar to FIG. 7, illustrating the slide member slideable along a main body of the hanger while the main body tilts to the right.
Figure 9:
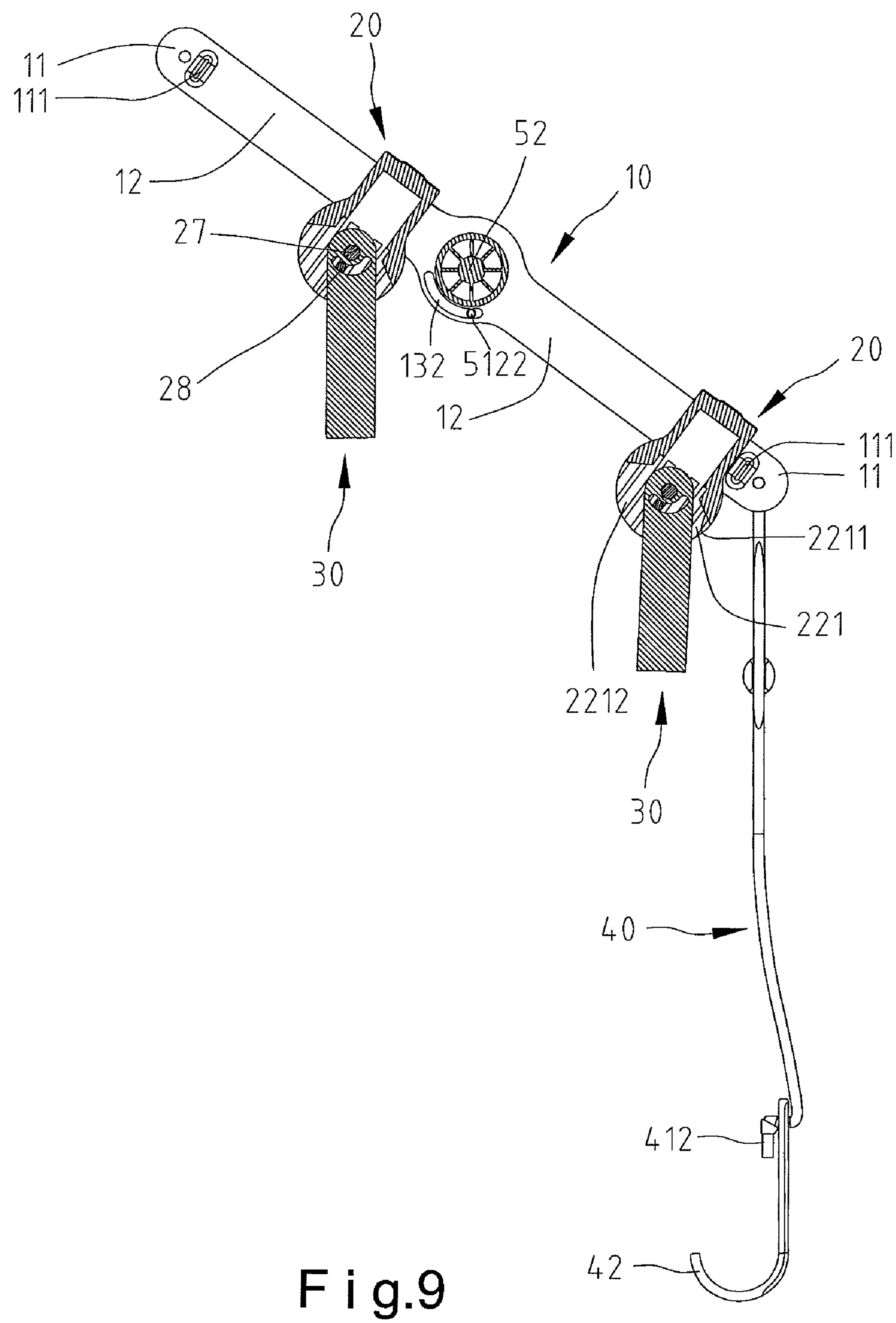
FIG. 9 is a front view of the hanger shown in FIG. 1 similar to FIG. 8, illustrating the slide member slideable along the main body of the hanger while the main body tilts to the left.

Referring to FIGS. 7 through 9, in order to suit various sizes of bicycles, the user can loosen each slide member knob 27, and the slide members 20 are capable to freely slide along the slide rails 12 and are restricted by the limiting portions 111, respectively. Moreover, the user can operate the fastener knob 52 to adjust a tilt angle of the body member 10 with respect to the ground to correspond to a tilt angle of the top tube of the bicycle. Also the hook elements 42 are adapted to clamp two ends of the handlebar of the bicycle for preventing the bicycle from rotating with respect to the hanger.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A hanger comprising:

a body member including two hanging ends, a pivoted portion between the hanging ends and two slide rails provided between the pivoted portion and hanging ends respectively;

a fastener unit coupled to the pivoted portion for positioning the body member in a horizontal direction;

two slide members respectively slideably disposed on the slide rails, with each slide member including a first receiving groove inserted by the related slide rail and a second receiving groove, with the second receiving groove forming a pivoted receptacle proximal to the bottom side of each slide member, with the pivoted receptacle having an arcuate bottom edge and two abutted sides; and two hook members pivotally coupled to the slide members respectively, with a longitudinal direction of each hook member being perpendicular to ground.

2. The hanger as claimed in claim 1, further comprising a hanger stand, with the body member adjustably and pivotally attached to the hanger stand via the fastener unit.

3. The hanger as claimed in claim 1, with the pivoted portion having a through-hole at the center thereof and an arcuate slot alongside the circumference thereof, with the fastener unit including a clamping element having a limited projection and a fastener knob engaging the clamping element with the pivoted portion, and with the limited projection provided in the arcuate slot for sliding therealong.

4. The hanger as claimed in claim 3, wherein the body member pivots with respect to the fastener unit and a pivotal angle of the body member is restricted by a dimension of the arcuate slot.

5. The hanger as claimed in claim 1, further comprising a plurality of slots longitudinally formed on a bottom surface of the pivoted receptacle adjacent to the first receiving groove.

6. The hanger as claimed in claim 1, wherein each hook member includes a connected end received in the pivoted receptacle and a hook end extending from the connected end adapted for hanging a top tube of a bicycle or hanging a kayak.

7. The hanger as claimed in claim 6, further comprising a hook strap unit selectively installed to one of the hanging ends and adapted to clamp handlebars of the bicycle to fix a head tube of the bicycle.

8. The hanger as claimed in claim 7, wherein the hook strap unit includes a strap, two hook elements and a tightening element, with each hook element including a connected end, a hook end extending from the connected end and a hole defined on the connected end.

9. The hanger means as claimed in claim 8, with an extending direction of each hook end being perpendicular to that of each hook end; wherein the hanger is suitable to hang the top and head tubes of the bicycle at the same time.

10. The hanger as claimed in claim 1, wherein a pivotal angle of the hook member in the pivoted receptacle is restricted by the two abutted sides.

11. The hanger as claimed in claim 1, further comprising a hook strap unit selectively installed to one of the hanging ends and adapted to clamp handlebars of a bicycle to fix a head tube of the bicycle.

12. The hanger as claimed in claim 11, wherein the hook strap unit includes a strap, two hook elements and a tightening element, with each hook element including a connected end, a hook end extending from the connected end and a hole defined on the connected end.

13. The hanger as claimed in claim 11, further comprising a limiting portion provided on the body member between each hanging end and the related slide rail; and a connected hole between each limiting portion and the related hanging end; wherein the slide members respectively slide along the slide rails and are restricted by the limiting portions.

14. The hanger as claimed in claim 1, further comprising a limiting portion provided on the body member between each hanging end and the related slide rail; wherein the slide members respectively slide along the slide rails and are restricted by the limiting portions.

15. A hanger comprising:

a body member including two hanging ends, a pivoted portion between the hanging ends and two slide rails provided between the pivoted portion and hanging ends respectively;

a fastener unit coupled to the pivoted portion for positioning the body member in a horizontal direction;

two slide members respectively slideably disposed on the slide rails, with each slide member including a first receiving groove inserted by the related slide rail and a second receiving groove;

two hook members pivotally coupled to the slide members respectively, with a longitudinal direction of each hook member being perpendicular to the ground, with each of the two hook members including a connected end; and a first hole and a second hole both piercing through the first and second receiving grooves transversely, with each connected end having a pivotal hole and an arcuate hole respectively corresponding to the first hole and the second hole, with each slide member including a slide member knob inserted through the first hole and the pivotal hole as to pivotally install each hook member to the related slide member, and with a pin inserted through the second hole and the arcuate hole.

16. The hanger as claimed in claim 15, wherein the pin is restricted by the arcuate hole, and wherein the pivotal angle of the hook member in the pivoted receptacle is restricted by the arcuate hole.

* * * * *